United States Patent Office.

MACKLOT THOMPSON, OF ST. LOUIS, MISSOURI.

Letters Patent No. 92,901, dated July 20, 1869.

IMPROVEMENT IN MASHING GRAIN FOR DISTILLATION.

The Schedule referred to in these Letters Patent and making part of the same.

*To whom it may concern:*

Be it known that I, MACKLOT THOMPSON, of St. Louis, in the county of St. Louis, and State of Missouri, have invented a certain new and useful Method of Preparing or Mashing Grain for Distillation; and I hereby declare the following to be a full, clear, and exact description of the same.

My invention has relation to the preparation or mashing of corn and other grain for distillation; and its object is to utilize, as far as possible, all the grain, so as to obtain, from a given quantity of the same, a greater yield of  than has heretofore been practicable.

In preparing grain for the purpose, it is usually subjected to a preliminary grinding; but I have found that the mills cannot grind with sufficient accuracy to reduce all the grain to such condition that the malt, or other saccharifying-substance, will act upon it with the best results; nor can the mash-rake break it up sufficiently to allow all starch to be extracted from the meal.

This is demonstrated by an examination of the slop or residuum, in which will be found a great many particles of corn, particularly the heart of the corn, that have not been attacked.

In the fermenting-tub this condition of the grain is even more noticeable, and in the mashing-tub the quantity of unattacked corn or grain is still greater.

It is evident, therefore, that the yield of spirit under these conditions cannot be so great as it would be were the grain reduced to such a state that all its particles could be fully exposed to the action of the saccharifying-agent; and the object of my invention is to effect this result, to which end it essentially consists in subjecting the meal, after being boiled in the usual manner, to a grinding-operation, so as to thoroughly reduce it to a pulp before it passes to the mash-tub, in which it is attacked by the malt or other saccharifying-agent, the remainder of the process being conducted in the ordinary manner.

One method of putting the invention in practical operation is as follows:

I take two common distillery mash-tubs, placed one above the other, the one intended for boiling or mashing the grain, the other for mixing it with the malt, and interpose between them a "Bogardus mill," well known to those skilled in the art to which this invention pertains.

A pipe conducts this boiled meal from the upper boiling or mashing-tub into the mill, where it is thoroughly ground and reduced to a pulp.

When brought to this state, the mass is discharged from the mill, through a pipe, into the lower mash-tub, where it is treated with malt or other saccharifying-agent, the remainder of the operation being conducted in the usual way.

In lieu of the Bogardus mill, other grinding-apparatus may be employed, or even a system of rollers; but the apparatus first specified is by far preferable, since it clears itself, and does not clog up, which other apparatus, and especially the rollers, would be liable to do.

Other arrangements for the purpose may be devised, but the one described illustrates clearly the nature of my invention, which is not dependent upon any specific arrangement of apparatus, all that is required being that the boiled grain should be thoroughly ground or pulped before passing to the mash-tub, in which it is attacked by the saccharifying-agent.

Having now described my invention, and the manner in which the same is or may be carried into effect,

What I claim, and desire to secure by Letters Patent, is—

The method, herein described, of preparing or mashing grain for distillation, by grinding or pulping the same after it has been boiled or mashed, and before it is subjected to the action of the malt or other saccharifying-agent, substantially as and for the purposes set forth.

In testimony whereof, I have signed my name to this specification, before two subscribing witnesses.

MACKLOT THOMPSON.

Witnesses:
GEO. W. SIMPKINS,
JNO. A. LADD.